United States Patent

Bauer

[15] 3,635,488
[45] Jan. 18, 1972

[54] ONE-TRACK SLIDING VEHICLE

[72] Inventor: Theodor Bauer, Leinfelden, Germany

[73] Assignee: Firma Dr.-Ing. h. c. F. Porsche K.G., Stuttgart-Zuffenhausen, Germany

[22] Filed: Sept. 9, 1969

[21] Appl. No.: 856,382

[30] Foreign Application Priority Data

May 10, 1969 Germany ..................... P 19 23 926.0

[52] U.S. Cl. ............................................. 280/16, 280/25
[51] Int. Cl. ............................................................. B62b 13/04
[58] Field of Search ....................................... 280/16, 21, 25

[56] References Cited

UNITED STATES PATENTS 3,560,012  2/1971  Auer .......................................... 280/16
2,883,205  4/1959  Dulski .................................. 280/287 X

FOREIGN PATENTS OR APPLICATIONS 1,218,660  6/1966  France .................................... 280/16
804,400    4/1951  Germany ................................ 280/16
478,091    2/1953  Italy ...................................... 280/16

Primary Examiner—Leo Friaglia
Assistant Examiner—Winston H. Douglas
Attorney—Craig, Antonelli & Hill

[57] ABSTRACT

A one-track sliding vehicle or sled having a supporting frame, a steering mechanism rotatably mounted at the supporting frame, and a steering runner hingedly mounted about the horizontal axis on the steering mechanism. A sliding runner is also connected with the supporting frame by means of a bilaterally effective spring element, and guide means are provided which, together with the supporting frame and sliding runner, are approximately in the form of a parallelogram. The sliding runner and its corresponding sliding plane are mounted so that, in any operating position, they are oriented toward a base point located in the zone of the steering runner on a circular arc having a radius substantially corresponding to the shortest distance between the horizontal axis and the sliding plane of the steering runner.

14 Claims, 1 Drawing Figure

PATENTED JAN 18 1972
3,635,488
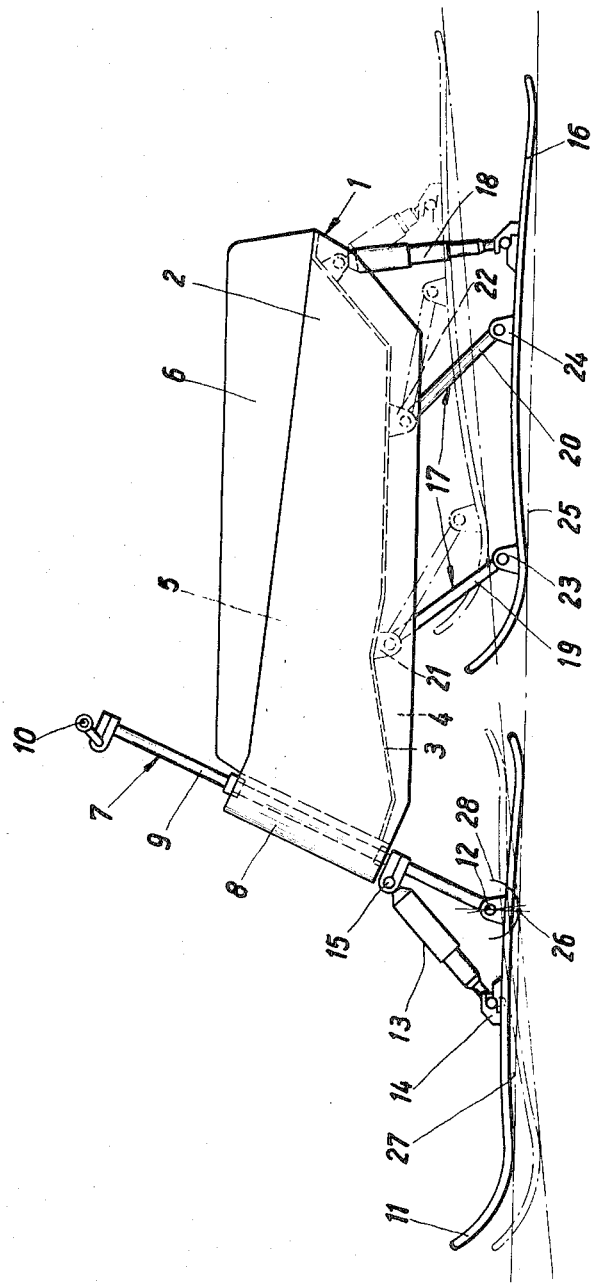
Inventor:
Theodor Bauer
By Craig, Antonelli, Stewart & Hill
ATTORNEYS

ONE-TRACK SLIDING VEHICLE

BACKGROUND OF THE INVENTION

The present invention relates to a one-track sliding vehicle or sled, and more particularly, a one-track sliding vehicle comprising a supporting frame on which a steering mechanism, a steering runner and a sliding runner are provided; the steering mechanism is associated with the steering runner which is mounted so as to be pivotable about an axis, and the sliding runner is constructed so as to be movable and supported by a spring element.

In a conventional sliding vehicle the steering runner and the sliding runner are designed to be movable with respect to the supporting frame. In this arrangement, the sliding runner is attached to telescopically cooperating bearing members which are vertically aligned and surrounded by spring elements. However, the disadvantage of this type of construction is that, with an increasing stroke of the sliding runner, only the terminal zone or portion of the sliding runner surface is in contact with the ground or slides along the track. Consequently, the lateral guidance of the sliding runner is reduced during the driving of the sled and, thereby, has a disadvantageous effect on the steerability of the sliding vehicle. In addition, the guide elements of the sliding runner in this type of construction require complicated and, accordingly, expensive structural components.

SUMMARY OF THE INVENTION

It is the aim of the present invention to improve the driving and steering properties of one-track sliding vehicles of the aforementioned type in such a manner that, in any operating position of the sliding runner, satisfactory contact with the track or ground is maintained.

The foregoing is accomplished in accordance with the present invention by hingedly connecting the sliding runner to the supporting frame so that, in any operating position, the sliding runner is aligned or oriented with its sliding plane always approximately with respect to a base point disposed in the proximity of the swivel axis of the steering runner. In this connection, it is advantageous if the base point for the sliding plane of the sliding runner is disposed in the zone of the steering runner sliding plane. The base point is also advantageously positioned on a circular arc having a radius which corresponds to the shortest distance between the swivel axis and the steering runner sliding plane. In a further embodiment of the invention, the sliding runner is hingedly mounted to the supporting frame so as to form, by means of guide elements, an approximate parallelogram. In the normal position of this type of sliding runner, the guide elements are disposed substantially parallel with respect to each other. The guide of the sliding runner positioned remotely from the steering mechanism is constructed to be shorter than the other guide element.

The advantages of the present invention reside, in particular, in the fact that the sliding runner, in any operating position, contacts the track with its entire running surface, thereby ensuring satisfactory lateral guidance of the sliding runner during driving of the sled and thus having an advantageous effect on the steerability of the one-track slide vehicle. The guide mechanism is formed by simple guide elements which can be identical in their basic construction.

BRIEF DESCRIPTION OF THE DRAWING

These and further features, advantages and objects of the present invention will become more apparent from the following description when taken in connection with the accompanying drawing which shows, for purposes of illustration only, an embodiment in accordance with the present invention, and wherein:

The sole FIGURE illustrates a lateral view of a one-track sliding vehicle or sled in accordance with the present invention.

DETAILED DESCRIPTION OF THE DRAWING

Referring now to the drawing, the one-track sliding vehicle 1 comprises a supporting frame 2 made of a suitable plastic material and constructed as a hollow body. A transverse wall 3 subdivides the supporting frame into two cavities or hollow spaces 4, 5. The cavity 4 is freely accessible, while the cavity 5 is closed off by a hinged seat 6 which extends substantially over the length of the supporting frame 2. A steering mechanism 7, which is detachably connected with the supporting frame 2, is held in a supporting tube 8 of the supporting frame 2 and comprises a steering column 9 which is provided with a steering device such as a handlebar 10 at its upper end. A steering runner 11 is disposed at the lower end of the steering column 9 and is further movably connected in a pivotable fashion with the steering column 9 by means of an axle 12. Further, a bilaterally effective spring element 13 cooperates with the steering runner 11 and is held in position at the steering runner by means of a quick-locking mechanism 14 and at the steering column 9 by means of an abutment or mounting 15.

A sliding runner 16 is provided on the underside of the supporting frame 2 and is connected to the supporting frame by a guide mechanism designated generally by the numeral 17. The sliding runner 16 is cushioned by a bilaterally acting spring element 18. The guide mechanism 17 is composed of guide elements 19, 20, cooperating with mounting members or abutments 21, 22 and 23, 24, respectively, mounted at the supporting frame 2 and at the sliding runner 16. In basic position of the sliding runner 16 shown in full lines in the drawing, the guide elements 19, 20 extend substantially parallel with respect to each other. The rear guide element 20, which is remotely disposed from the steering mechanism, is shorter than the front guide element 19 so that, upon movement or flexing of the spring element 18 of the sliding runner 16, the sliding runner is not adjusted in parallel with respect to the supporting frame 2 but, to the contrary, is displaced to an oblique or skewed orientation as illustrated by the phantom lines in the drawing.

The above arrangement and construction of the guide elements 19, 20 has the effect that the sliding runner 16 is always approximately aligned or oriented with its sliding plane 25, to a base point 26 disposed in the vicinity of the swivel axis 12 of the steering runner 11. The base point 26 for the sliding plane 25 of the sliding runner 16 is disposed in the zone of the sliding plane of the steering runner 11. The base point 26 is advantageously located on a circular arc 28 having a radius which corresponds to the shortest distance between the swivel axis 12 and the sliding plane 27 of the front steering runner 11.

During movement or flexing of the spring element 18 of the sliding runner 16, the sliding plane 25 of the sliding runner 16 is, as shown in phantom lines, aligned or oriented in any position toward the base point 26 independently of the respective position of the steering runner 11 along with its sliding plane 27. Thus, good contact of the sliding runner 16 with the track along the entire length of the sliding runner and also whereby a good lateral guidance of the sliding runner is assured upon a spring stroke of the sliding runner 16. Therefore, the consequent advantage obtained is that the sliding vehicle has considerably improved steering properties as compared with the sleds of previous constructions.

While I have shown and described only one embodiment in accordance with the present invention, it is understood that the same is not limited thereto but is susceptible of numerous changes and modifications as known to a person skilled in the art, and I, therefore, do not wish to be limited to the details shown and described herein but intend to cover all such changes and modifications as encompassed by the scope of the invention.

I claim:

1. A one-track sliding vehicle having a supporting frame, a steering mechanism being operatively associated with said supporting frame, a steering runner adapted to be pivotably mounted with respect to said steering mechanism, and a sliding runner having a sliding plane and being movably supported with respect to said supporting frame, characterized in that means are provided for orienting said sliding runner and the sliding plane of said sliding runner, in any operating position, approximately toward a point disposed in the proximity of the swivel axis of the steering runner.

2. A one-track sliding vehicle according to claim 1, wherein said steering runner is hingedly connected at said steering mechanism.

3. A one-track sliding vehicle according to claim 1, further including spring means for movably supporting said sliding runner with respect to said supporting frame.

4. A one-track sliding vehicle according to claim 3, wherein said sliding runner is adapted to be pivotably connected at said supporting frame.

5. A one-track sliding vehicle according to claim 4, wherein said steering runner is adapted to be hingedly connected about an axis at said steering mechanism.

6. A one-track sliding vehicle according to claim 4, further including guide means for hingedly connecting said sliding runner at said supporting frame whereby said sliding runner, said supporting frame and said guide means together form an approximate parallelogram.

7. A one-track sliding vehicle according to claim 6, wherein said steering runner is adapted to be hingedly connected about an axis at said steering mechanism.

8. A one-track sliding vehicle according to claim 7, wherein said guide means are approximately parallel with respect to each other when said sliding runner is in a normal position.

9. A one-track sliding vehicle according to claim 7, wherein one of said guide means is disposed remotely from said steering mechanism and is adapted to be shorter than another of said guide means disposed closer to said steering mechanism.

10. A one-track sliding vehicle according to claim 9, wherein said guide means are approximately parallel with respect to each other when said sliding runner is in a normal position.

11. A one-track sliding vehicle according to claim 1, wherein said point is located on a circular arc having a radius substantially corresponding to the shortest distance between said axis and the sliding plane of said steering runner.

12. A one-track sliding vehicle according to claim 1, wherein said point is located on a circular arc having a radius substantially corresponding to the shortest distance between said axis and the sliding plane of said steering runner.

13. A one-track sliding vehicle according to claim 12, wherein said guide means are approximately parallel with respect to each other when said sliding runner is in a normal position.

14. A one-track sliding vehicle according to claim 13, wherein one of said guide means is disposed remotely from said steering mechanism and is adapted to be shorter than another of said guide means disposed closer to said steering mechanism.

* * * * *